United States Patent [19]

Dreher et al.

[11] Patent Number: 4,552,815

[45] Date of Patent: Nov. 12, 1985

[54] PRESTRESSING ELEMENTS COATED WITH PLASTIC MATERIAL AND PROCESS FOR MAKING THEM

[75] Inventors: Bernd Dreher, Basel; Wolfgang Schneider, Kaiseraugst, both of Switzerland

[73] Assignee: Ciba Geigy Corporation, Ardsley, N.Y.

[21] Appl. No.: 534,995

[22] Filed: Sep. 22, 1983

[30] Foreign Application Priority Data

Oct. 1, 1982 [CH] Switzerland ............... 5808/82
Feb. 10, 1983 [CH] Switzerland ............... 756/83

[51] Int. Cl.$^4$ ............... B32B 27/38; B32B 27/40; B05D 1/36
[52] U.S. Cl. ............... 428/415; 428/416; 428/423.3; 428/424.4; 428/425.8; 428/425.9; 428/430; 428/441; 428/442; 428/367; 428/371; 428/372; 428/378; 428/383; 428/473.5; 428/463; 428/458; 427/203; 427/407.2; 427/409
[58] Field of Search ............... 428/413, 415, 425.8, 428/423.3, 424.4, 416, 417, 703, 473.5, 425.9, 458, 463; 427/203, 407.2, 409

[56] References Cited

U.S. PATENT DOCUMENTS

| | | | |
|---|---|---|---|
| 3,552,973 | 1/1971 | Fishman | 96/90 |
| 3,956,043 | 5/1976 | Zahir et al. | 156/3 |
| 4,033,805 | 7/1977 | Mitsui et al. | 427/203 X |
| 4,072,592 | 2/1978 | Dué et al. | 428/413 X |
| 4,091,124 | 5/1978 | Reighter | 428/413 X |
| 4,107,174 | 8/1978 | Baumann et al. | 260/326 NS |
| 4,268,542 | 5/1981 | Sakakibara et al. | 427/203 X |

FOREIGN PATENT DOCUMENTS 2018941 11/1971 Fed. Rep. of Germany.

OTHER PUBLICATIONS

Derwent 710015A.

*Primary Examiner*—Patrick C. Ives
*Attorney, Agent, or Firm*—Luther A. R. Hall

[57] ABSTRACT

Prestressing elements having a two-layer plastics covering, the inner layer being moldable, storage-stable at room temperature and thermally curable, and the outer layer consisting of a radiation-cured plastics material, are excellently suitable for producing supporting structural elements, particularly concrete supporting structures and rock bracings.

15 Claims, No Drawings

PRESTRESSING ELEMENTS COATED WITH PLASTIC MATERIAL AND PROCESS FOR MAKING THEM

The present invention relates to prestressing elements coated or sheathed with two plastic layers, especially for concrete supporting structures, the inner plastic layer being a storage-stable, moldable and thermosetting composition, and the outer layer being a hard, radiation-cured plastic layer, to a process for producing these elements and to their use.

Prestressing elements for concrete supporting structures, which elements are provided with a two-layer plastic covering, have been known for some considerable time from the German Patent Specification No. 2,018,941. The overall plastic covering fulfills various functions. Thus, the supporting core of the prestressing element has to be effectively protected from corrosion, and the plastic layers have to exhibit a highly durable bond or connection to the surrounding binder, the requirement at the same time being that the two plastic layers are firmly bonded together. The outer plastic layer has to also act as a protective layer for the inner plastic layer.

It has proved to be an insoluble problem hitherto to produce the two layers without intermixing and without the formation of defective portions which, on further processing, are the cause of corrosion and of a reduction of the adhesive strength in the bond. Furthermore, it is extremely desirable that the outer plastic layer can be gripped as quickly as possible after production, thus simplifying handling, storage and transport, and providing simultaneously an effective protection of the inner layer. A satisfactory solution for avoiding a concomitant reaction of the inner layer on application and curing of the outer layer has also not so far been suggested.

It is the object of the present invention to provide prestressing elements having a two-layer plastic covering which, after the processing of the elements, for example into concrete supporting structures, offers an effective protection against corrosion, the two layers possessing a high bonding strength, and the inner layer of the coated prestressing element being stable in storage at least during the time until further processing is carried out; the coated prestressing elements are easy to handle, even shortly after their preparation, and are moreover storable; the outer layer is an effective protection for the inner layer, and in production an intermixing of the layers with the formation of defective areas between them is largely eliminated. It is furthermore to be avoided that the inner layer concomitantly reacts when the outer layer is being cured. The outer layer has also to provide adequate heat insulation during heating and curing of the inner layer in order to ensure that no damage to the surrounding binder material occurs.

Subject matter of the present invention is a prestressing element onto which is applied an inner polymer-forming layer and an outer solid plastic layer, the layers being optionally separated by an intermediate layer, the said prestressing element being designed so that the inner layer consists of a moldable and thermally curable composition which is storage-stable at room temperature, and the outer layer consists of a plastic material cured by radiation.

The prestressing element can be made of various materials which are customarily used as reinforcing materials for binders, and can be employed in a variety of forms. Suitable materials are for example: metals, especially structural steels, as well as plastics, glass, carbon fibres and whiskers. The material has to have the property of being able to expand to a certain extent under tensile stress. Possible forms of such prestressing elements are for example: rods, strips, wires, stays, fibres, strands, single and multiple filaments, fabrics and mats.

The inner and outer plastic layers can also be separated by an intermediate layer of the most varied materials, for example glass fibers or metal filaments. If the material of the prestressing element is an electrical nonconductor, the intermediate layer contains an electrical conductor, for example a metal, for instance in the form of a wound wire, or the separating layer itself is an electrical conductor, in order to render possible an inductive heating for the curing of the inner layer. For this purpose it is also possible in the case of nonconductors for the core of the prestressing element to be wound with an electrical conductor before being coated.

The inner layer at room temperature is storage-stable. By this is meant that the composition may react only to an insignificant extent, at least up to the time of processing, in order to avoid premature curing. The inner layer is moreover moldable so that on application of stress a smooth sliding is possible without damage resulting in the inner layer, for example the formation of cracks. The inner layer can range from being of low viscosity to being solid, and can be rendered thixotropic in order to prevent any running or dripping off of the coating material. In the case where the inner layer is solid, its moldability is effected by heating and melting, whereupon the curing reaction can if necessary already be commencing.

The inner layer is thermally curable. In order to obtain a shrinkage-free curing, there are preferably used those starting materials which are curable by polyaddition or polymerization into the form of duroplasts. Suitable starting materials are for example unsaturated polyesters, particularly those based on maleic acid, which can be used on their own or in admixture with olefinically unsaturated compounds as reactive diluents. These starting materials are known to persons skilled in the art. Further suitable starting materials are polyesters based on acrylic acid and/or methacrylic acid and polyols, and also especially reaction products of epoxy resins with these acids, which likewise can be used with the reactive diluents mentioned.

A further group of suitable starting materials is formed by masked polyurethanes, particularly polyurethanes masked with phenols. These materials too are familiar to one skilled in the art.

A preferred group, by virtue of the attainable bonding strengths, consists of polyepoxide compounds. Suitable as such are for example in particular those having on average more than one glycidyl group, $\beta$-methylglycidyl group or 2,3-epoxycyclopentyl group each bound to a hetero atom (for example sulfur, or preferably oxygen or nitrogen); mention may be made especially of bis-(2,3-epoxycyclopentyl)ethers; di- or polyglycidyl ethers of polyvalent aliphatic alcohols, such as 1,4-butanediol, butanediol, or polyalkylene glycols, such as polypropylene glycols; di- or polyglycidyl ethers of cycloaliphatic polyols, such as 2,2-bis-(4- hydroxycyclohexyl)-propane; di- or polyglycidyl ethers of polyvalent phenols, such as resorcinol, bis-(p-hydroxyphenyl)-methane, 2,2-bis-(p-hydroxyphenyl)-propane (=Diomethan), 2,2-bis-(4'-hydroxy-3',5'-dibromophenyl)-propane, 1,1,2,2-tetrakis-(p-hydroxyphenyl)-ethane, or of condensation products of phenols with formaldehyde, obtained under acid conditions, such as phenol-novolaks and cresolnovolaks; di- or poly-($\beta$-methylglycidyl)ethers of the above-mentioned polyvalent alcohols or polyvalent phenols; polyglycidyl ethers of polyvalent carboxylic acids, such as phthalic acid, terephthalic acid, $\Delta^4$-tetrahydrophthalic acid and hexahydrophthalic acid; N-glycidyl derivatives of amines, amines and heterocyclic nitrogen bases, such as N,N-diglycidylaniline, N,N-diglycidyltoluidine, N,N,N',N'-tetraglycidyl-bis-(p-aminophenyl)-methane; triglycidyl-isocyanurate; N,N'-diglycidyl-ethyleneurea; N,N'-diglycidyl-5,5-dimethylhydantoin, N,N'-diglycidyl-5-isopropyl-hydantoin; N,N'-diglycidyl-5,5-dimethyl-6-isopropyl-5,6-dihydro-uracil.

The polyepoxide compounds can be pre-reacted with customary curing agents, such as polyamines, polyols and polycarboxylic acids, before application, to form optionally solid, still meltable products (B stages).

It is possible if desired to add to the polyepoxides, for the lowering of the viscosity, active diluents, for example styrene oxide, butylglycidyl ethers, isooctylglycidyl ethers, phenylglycidyl ethers or cresylglycidyl ethers, or glycidyl esters of synthetic, highly-branched, mainly tertiary, aliphatic monocarboxylic acids ("CARDURA E"). Such diluents are used in particular with solid epoxide resins.

Preferred among the polyepoxide compounds are the glycidyl ethers of aromatic polyphenols, for example of the bisphenols. They have in particular an epoxide content of 3 to 8, especially 4 to 6, Val/kg, and viscosity values of about 1000 to 20,000, particularly 1000 to 12,000 mPas. Especially preferred are the glycidyl ethers of bisphenol-A and bisphenol-F, as well as epoxidised novolaks.

The thermally curable inner layer additionally contains a curing agent if the curing reaction does not commence spontaneously when heat is supplied. A curing accelerator can also be added if required. Latent curing agents are then added in order to ensure stability in storage. They are those which can be activated by heat.

This heat activation can be effected on the basis of physical or chemical mechanisms. There can thus be used curing agents which are insoluble at room temperature in the curable starting material, but which dissolve on heating and melting of the curable layer, whereupon curing commences. It is also possible to use in the starting material dissolved curing agents which, when heating is applied, are converted into reactive compounds, for example radical formers for unsaturated polyesters; or organic compounds which split off H-acid compounds, such as bisphenols, polyols or polymercaptans, for polyurethanes; or organic compounds splitting off acids or bases for the polyepoxide compounds. A further possibility is the use of curing agent systems which react only very slowly at room temperature, but very rapidly with heating.

Latent curing agents particularly suitable for polyepoxide compounds are those which at room temperature are insoluble in the employed polyepoxide. Examples of these are: salts of aromatic carboxylic acids, such as benzoic acid, phenylacetic acid or naphthalenecarboxylic acid, and of aliphatic, cycloaliphatic and araliphatic polyamines, for example ethylene- or propylenediamine, diethylenetriamine, 1,4-diaminocyclohexane or xylylenediamine. They can be primary and secondary, especially however tertiary, polyamines, and preferably those tertiary polyamines which contain dimethylamino groups. A further group of suitable curing agents comprises solid, mono- or polynuclear phenols, such as bisphenols and novolaks, mono- and polynuclear aromatic polyamines, polycarboxylic acid anhydrides and polycarboxylic acids. Suitable as curing agents are also solid B-stage resins formed from polyepoxide compounds and polyamines or polycarboxylic acid anhydrides. Also suitable is dicyandiamide together with curing accelerators. The curing agents can be used simultaneously with accelerators, such as urea derivatives, imidazoles or tin salts.

The inner layer can also consist of a solid B-stage epoxy resin, which can be produced directly on the prestressing element for example by a pre-reaction of a layer of polyepoxides and curing agents, such as polyphenols, aromatic polyamines and polycarboxylic acid anhydrides. When the prestressing element is put under stress, these B-stage resins can be melted by inductive heating, hence ensuring the sliding action, and afterwards completely cured. The pre-reaction method is to be recommended for increasing storage stability when the epoxy resin/curing agent systems in the liquid form do not have sufficient stability in storage.

Suitable as radiation-curable starting materials for the outer layer are ethylenically unsaturated monomeric, oligomeric and polymeric compounds which react, by photopolymerisation or photodimerisation, to give higher-molecular solid products. Particularly suitable for this purpose are for example esters and amides of ethylenically unsaturated carboxylic acids and of polyols or polyepoxides, and polymers having ethylenically unsaturated groups in the chain or in side-chain groups, such as unsaturated polyesters, polyamides and polyurethanes, and copolymers thereof, polybutadiene and polybutadiene-copolymers, polyisoprene and polyisoprene-copolymers, polymers and copolymers having maleimidyl groups or acrylic or methacrylic groups in side chains, or unsaturated epoxy resins, and also mixtures of one or more of such polymers.

Examples of ethylenically unsaturated carboxylic acids are acrylic acid, methacrylic acid, crotonic acid, itaconic acid, cinnamic acid, or unsaturated fatty acids, such as linolenic acid or oleic acid. Acrylic and methacrylic acid are preferred.

Suitable polyols for the esters are aromatic and especially aliphatic and cycloaliphatic polyols. Examples of aromatic polyols are: hydroquinone, 4,4'-dihydroxyphenylene, bisphenols, such as bisphenol-A or -F, as well as novolaks and resols. Suitable polyepoxides for the esters are for example those based on the aforementioned polyols, particularly on aromatic polyols and epichlorohydrin. Suitable as aliphatic polyols are also polymers or copolymers having hydroxyl groups on the polymer chain or in side groups, for example polyvinyl alcohol and copolymers thereof, or polymethacrylic acid hydroxyalkyl esters, such as $\beta$-hydroxyethyl esters or copolymers thereof. Further suitable aliphatic polyols are oligo esters having hydroxyl terminal groups.

A preferred group of aliphatic or cycloaliphatic polyols are those of the formula $R_n(OH)_n$ wherein R is an n-valent, preferably 2- to 8-valent, especially 2- to 6-valent, aliphatic radical having 2 to 30 C atoms, which can be interrupted by nitrogen, sulfur and particularly oxygen atoms as well as by cycloalkylene, or it is cycloalkylene having 5 or 6 ring carbon atoms. Examples of such polyols are alkylenediols having preferably 2 to 12 C atoms, such as ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably 100 to 1500, 1,3-cyclopentanediol, 1,2-, 1,3- or 1,4-cyclohexanediol, 1,4-dihydroxymethylcyclohexane, glycerol, tris-(β-hydroxyethyl)amine, trimethylolethane, trimethylolpropane, pentaerythritol, dipentaerythritol and sorbitol.

The polyols can be esterified partially or completely with one or with various ethylenically unsaturated carboxylic acids, and in partial esters the free hydroxyl groups can be modified, for example etherified, or can be esterified with other carboxylic acids. Examples of such esters are: trimethylolpropanetriacrylate, trimethylolethanetriacrylate, trimethylolpropanetrimethacrylate, trimethylolethanetrimethacrylate, tetramethylene glycol dimethacrylate, triethylene glycol dimethacrylate, tetraethylene glycol diacrylate, pentaerythritol diacrylate, pentaerythritol triacrylate, pentaerythritol tetracrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol dimethacrylate, 1,3-butanediol diacrylate, 1,3-butanediol dimethacrylate, 1,4-butanediol diitaconate, sorbitol triacrylate, sorbitol hexaacrylate, sorbitol tetramethacrylate, sorbitol pentaacrylate, sorbitol hexaacrylate, oligo ester acrylate, oligo ester methacrylate, glycerol di- and -triacrylate, 1,4-cyclohexane diacrylate, bis-acrylates and bismethacrylates of polyethylene glycol having a molecular weight of 100–1500, or mixtures thereof.

Suitable also are the amides of identical or different unsaturated carboxylic acids of aromatic, cycloaliphatic and aliphatic polyamines having preferably 2 to 6, in particular 2 to 4, amino groups, and 2 to 30, especially 2 to 18, C atoms. Examples of amines are alkylenediamines having preferably 2 to 22 C atoms, such as ethylenediamine, 1,2- or 1,3-propylenediamine, 1,2-, 1,3- or 1,4-butylenediamine, 1,5-pentylendiamine, 1,6-hexylenediamine, octylenediamine, dodecylenediamine, 1,4-diaminocyclohexane, isophoronediamine, phenylenediamine, bisphenylenediamine, di-β-aminoethyl ether, diethylenetriamine, triethylenetetramine, di-(β-aminoethoxy)- or di-(β-aminopropoxy)ethane. Examples of such amides are: methylene-bisacrylamide, 1,6-hexamethylene-bis-acrylamide, diethylenetriamine-tris-methacrylamide, bis(methacrylamidopropoxy)ethane, β-methacryl-amido-ethylmethacrylate or N[(β-hydroxyethyloxy)ethyl]-acrylamide. Further suitable polyamines are polymers and copolymers having amino groups in the side chain, and oligoamides having amino terminal groups.

Suitable unsaturated polyesters and polyamides as starting materials curable by radiation are derived for example from maleic acid and diols or diamines. The maleic acid can be partially replaced by other dicarboxylic acids. They can be used together with ethylenically unsaturated comonomers, for example styrene. The polyesters and polyamides can also be derived from dicarboxylic acids and ethylenically unsaturated diols or diamines, particularly from long-chain ones having for example 6 to 20 C atoms. Examples of polyurethanes are those which are synthesised from saturated or unsaturated diisocyanates and unsaturated or saturated diols.

Radiation-curable polybutadienes and polyisoprenes and copolymers thereof are known. Suitable comonomers for such copolymers are for example polyolefins, such as ethylene, propene, butene, hexene, acrylates and methacrylates, acrylonitrile, styrene or vinyl chloride. Radiation-curable polymers having maleimidyl groups in the side chain are described for example in the German Patent Application No. 2,626,795. Radiation-curable polymers having acrylate and/or methacrylate groups in the side chain are likewise known. They can be for example reaction products of epoxy resins based on novolaks with acrylic and/or methacrylic acid; homo- or copolymers of polyvinyl alcohol or hydroxyalkyl derivatives thereof, which are esterified with acrylic and/or methacrylic acid; or homo- or copolymers of acrylates or methacrylates having oxoalkylacrylate or -methacrylate groups. In the case of the radiation-curable, unsaturated epoxy resins they are mainly those which contain an

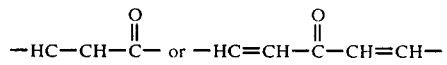

group. Such epoxy resins are described for example in the German Patent Application No. 2,342,407.

The starting materials curable by radiation can be used on their own or in any chosen mixtures. Of advantage is the addition of esters of unsaturated carboxylic acids, especially of acrylates or methacrylates of polyols, and/or further vinyl compounds, such as vinyl pyridine or vinyl pyrrolidone.

Further suitable starting materials curable by radiation are for example also epoxy resins with latent curing agents which can be activated by radiation, particularly epoxy resins based on aromatic polyols. Examples of such latent curing agents are: α- and β-acylsulfonyloxy compounds, diazonium salts, onium salts of the elements of the groups Va, VIa or VIIa of the periodic system, for example the chlorides, bromides, iodides, and especially the salts of complex acids, such as hexafluorophosphate and hexafluoroarsenate; N-sulfonyloxyimides; esters of sulfonic acids with α-methylol benzoins and o-hydroxyacylphenones; o-nitrobenzaldehydes and α-chloro- or α-bromoacylphenones. Preferred among the onium salts are the sulfonium salts, for example triphenylssulfonium hexafluorophosphate. Suitable latent curing agents are also metallocene salts, for example (η⁶-methylnaphthalene)-(η⁵-cyclopentadienyl)iron-II-hexafluorophosphate. Suitable starting materials curable by radiation are also oligomers and polymers which contain aromatic diazides as crosslinking agents.

The outer layer contains preferably a radiation-cured epoxyacrylate or epoxymethacrylate, epoxy resin, polyester acrylate or polyester methacrylate based on bisphenol (unsaturated polyurethane or polyester), or a polymer having maleimide side groups, particularly dimethyl maleimide groups.

The outer layer contains particularly preferably a radiation-cured epoxyacrylate or epoxymethacrylate admixed with at least one acrylic ester or methacrylic ester of an aliphatic polyol.

It is also possible to add binders to the outer layer, which is particularly advantageous when the radiation-curable starting materials are liquid or viscous substances.

Suitable binders are for example polymers having a molecular weight of about 5,000 to 2,000,000, preferably 10,000 to 1,000,000. Examples are: homo- and copolymeric acrylates and methacrylates, for example copolymers from methylenemethacrylate/ethylacrylate/-methacrylic acid, poly(methacrylic acid alkyl ester), poly(acrylic acid alkyl ester), alkyl being $C_1$–$C_{20}$, cellulose esters and -ethers, such as cellulose acetate, cellulose acetate butyrate, methyl cellulose, ethyl cellulose, polyvinyl butyral, polyvinyl formal, cyclised rubber, polyethers, such as polyethylene oxide, polypropylene oxide, polytetrahydrofuran; polystyrene, polycarbonate, polyurethane, chlorinated polyolefins, polyvinyl chloride, copolymers from vinyl chloride/vinylidene chloride, copolymers from vinylidene chloride with acrylonitrile, methyl methacrylate and vinyl acetate, polyvinyl acetate, copoly(ethylene/vinyl acetate), polyamides, such as poly(hexamethyleneadipamide), and polycaprolactam, polyesters, such as poly(ethylene glycol terephthalate) and poly(hexamethylene glycol succinate).

The radiation-curable starting materials selected are advantageously such that the outer layer is stable to hydrolysis and is non-shrinking. To increase the light sensitivity it is possible to add initiators and sensitisers, such as aromatic ketones, for example tetramethyldiaminobenzophenone, benzophenone, Michler's ketone (4,4'-bis-(dimethylamino)benzophenone), 4,4'-bis(-diethylamino)benzophenone, 4-acryloxy-4'-diethylaminobenzophenone, 4-methoxy-4'-dimethylaminobenzophenone, 2-ethylanthraquinone, phenanthraquinone, 2,6-butylanthraquinone, 1,2-benzanthraquinone, 2,3-benzanthraquinone, 2,3-dichloronaphthoquinone, benzyldimethyl ketal and aromatic ketones according to U.S. Pat. No. 3,552,973; benzoin, benzoin ether, such as benzoin methyl ether, benzoin ethyl ether, benzoin isobutyl ether and benzoin phenyl ether, methyl benzoin, ethyl benzoin and other benzoins, p-maleimidobenzenesulfonic acid azide, thioxanthone derivatives, such as thioxanthone, 2-chlorothioxanthone, 2-isopropylthioxanthone, thioxanthone-1-carboxylic acid ethyl ester, 3-methoxythioxanthone-1-carboxylic acid ethyl ester in conjunction with aromatic amines, such as p-dimethylaminobenzoic acid ethyl ester and 4,4'-bis(dimethylamino)benzophenone.

The curing of the radiation-sensitive starting materials can be effected by $\gamma$-radiation, X-rays, electron radiation, laser light and in particular by UV radiation.

It is particularly advantageous when the outer layer is additionally thermally curable, especially by way of the same functional groups as in the curable composition of the inner layer, for example epoxy groups. In a further embodiment, the outer layer contains functional groups which react simultaneously with the thermal curing of the inner layer. There is obtained in this way an especially good adhesion of the layers after curing. Possible functional groups are for example olefinically unsaturated groups, such as allyl or methallyl, OH, SH, —COOH, amino groups and urethane groups.

The thickness of the inner layer can in general be 50–300 $\mu$m, particularly 100–300 $\mu$m. The thickness of the outer layer is about 50 $\mu$m to about 1 mm, preferably 100 $\mu$m to 800 $\mu$m and especially 250 to 500 $\mu$m. When the outer layer contains fillers, the thickness can be about 400 $\mu$m to about 4 mm, preferably 600 $\mu$m to 2 mm. To obtain a better adhesion of the coated prestressing element with the surrounding binder, the element can be roughened in the usual manner.

The inner and the outer layers can contain customary additives, such as thixotropic agents, adhesion promoters, and finely divided fillers of all types, and other processing auxiliaries, and additives improving the final properties. The outer layer can be roughened or structured by an addition of filler in order to achieve a better bond with the binder. For obtaining heat insulation, there can be added to the outer layer for example glass beads.

The prestressing elements according to the invention are produced, in a manner known per se, by firstly applying to the core of the prestressing element the inner layer by means of customary application methods, such as dipping, pouring, brushing or spraying, and, if required, coating this layer with a separating material. A method which has proved satisfactory is spraying with ring nozzles. The coating is unnecessary when a solid but still moldable inner layer is applied, for example using B-stage resins. The composition of the inner layer can be applied dissolved in a solvent to the surface, whereupon the solvent is removed. Economically more advantageous is however the direct coating, which is made possible by the choice of compositions having a low viscosity. The outer layer is then applied to the inner layer or to the operating layer, and is cured, advantageously shortly after application, by radiation, preferably with UV lamps, such as mercury vapour lamps.

Further subject matter of the invention is hence a process for producing a two-layer plastic coating for prestressing elements, the two plastic layers being if necessary separated by an intermediate layer, which process comprises
  (a) applying to the prestressing element an inner layer consisting of a moldable and thermally curable composition which is stable in storage at room temperature, and, after coating if necessary this layer with a separating material,
  (b) applying an outer layer of a composition curable by radiation, and
  (c) curing afterwards the outer layer by radiation.

There can thus be obtained in a simple manner, without long reaction times and further expenditure, such as for complicated holding devices for a long curing time, prestressing elements which have a two-layer plastic coating, which are immediately storable and transportable, and which contain a layer that is still reactive but sufficiently storage-stable until it is processed, the two plastic layers not becoming in the process intermixed, which can be the cause of defects, but remaining separated from one another.

The prestressing elements according to the invention are excellently suitable for producing prestressed supporting constructions. A further subject matter of the present invention is this application. For this purpose the prestressing elements are firstly prestressed, and then eveloped by a binder, for example thermoplastic or duroplastic plastics, or structural materials, such as concrete, the inner layer being subsequently heated and cured. Heating is effected by an induction current which is induced by application of a voltage to the core of the prestressing element, or to an electrically conducting intermediate layer in the case of nonconductors. There is obtained a strong bond which can withstand high loads, and in which an effective corrosion protection for the core of the prestressing element is provided.

A particular field of application for the prestressing elements according to the invention is the production of concrete supporting structures, such as towers, bridges, ceilings, walls of large containers, as well as rock bracings.

The following Examples further illustrate the invention.

EXAMPLE 1

There is applied to a structural steel, by spraying, the following inner layer:
a mixture of
100 parts by weight of epoxy resin based on bisphenol-A having an epoxide content of 5.2–5.5 Val/kg and a viscosity of 9,000–12,000 mPa at 25° C.;
13 parts by weight of a curing agent formed from
  8 parts by weight of dicyandiamide,
  4 parts by weight of 3-(p-ethoxyphenyl)-1,1-dimethylurea,
  0.3 part by weight of silicic acid (Aerosil) and
  0.7 part by weight of dibutyl phthalate.

The layer thickness is 200 to 300 μm. This layer is wound with a band, and the following outer light-curable layer (about 350 μm thick) is applied to the band:
60 parts by weight of epoxyacrylate (reaction product of acrylic acid and bisphenol-A-diglycidyl ether; 70% strength solution in tripropylene glycol diacrylate; viscosity of the solution: 17,000 mPa at 25° C.),
22 parts by weight of tripropylene glycol diacrylate,
12 parts by weight of trimethylolpropanetriacrylate,
4 parts by weight of benzildimethyl ketal,
2 parts by weight of triethanolamine,
20 parts by weight of talcum, and
6 parts by weight of silicic acid (Aerosil 200).

The layer is irradiated with UV light from a mercury vapour pressure lamp (80 watt/cm), and cured for 4–6 seconds. The layers are distinguished by good adhesion. The inner layer is storage-stable at room temperature (RT) for about 3 weeks, and can be cured by inductive heating at 150° C. for 10 to 15 minutes.

EXAMPLE 2

The procedure is carried out as in Example 1 except that the following inner layer is applied:
85 parts by weight of epoxy resin according to Example 1,
15 parts by weight of dibutyl phthalate, and
42 parts by weight of m-xylyenediaminedibenzoate.

The inner layer is slightly thixotropic, and is storage stable at RT upto about 3 months. Curing is effected by heating at 120° C. for 5 to 7 minutes.

EXAMPLE 3

The procedure is carried out as in Example 1 except that the following inner layer is applied:
92 parts by weight of epoxy resin according to Example 1,
8 parts by weight of dibutyl phthalate, and
37 parts by weight of ethylenediaminedibenzoate.

The inner layer is thixotropic, and is stable in storage at RT for 3 months. A complete curing is effected by inductive heating at 120° C. for 5 to 7 minutes.

EXAMPLE 4

The procedure is carried out as in Example 1 except that the following inner layer is applied and the separating layer is omitted:
100 parts by weight of epoxy resin according to Example 1,
29 parts by weight of curing agent based on di-(p-aminophenyl)methane,
2 parts by weight of a levelling agent,
1 part by weight of methanol,
27 parts by weight of bentone 27 (montmorillonite),
11 parts by weight of titanium dioxide,
10 parts by weight of microtalcum, and
34 parts by weight of heavy spar.

There results after 10 hours' curing at room temperature a B-stage resin as a solid layer, onto which the outer layer is directly applied. The storage stability at RT is about 2 months. Curing of the inner layer is effected by inductive heating at 120° C. for 15 to 20 minutes.

EXAMPLE 5

(a) Steel rods (d=32 mm) are degreased and the surface is cleaned. There is then applied to the surface, with a brush, an inner layer consisting of a mixture of
(a) 100 parts by weight of epoxy resin according to Example 1,
(b) 8 parts by weight of dibutyl phthalate, and
(c) 40 parts by weight of ethylenediaminedibenzoate.

The film thickness is 200–400 μm. The wet layer is wound with a glass filament tape (30–50% overlapping). There is subsequently applied, with a brush, the outer layer consisting of the following mixture:
(a) 420 parts by weight of unsaturated polyurethane (Actilane AJ 18, SNPE),
(b) 175 parts by weight of 1,6-hexanedioldiacrylate,
(c) 105 parts by weight of 1-vinyl-2-pyrrolidone,
(d) 7 parts by weight of silicic acid (Aerosil 200, Degussa),
(e) 262 parts by weight of talcum, and
(f) 31 parts by weight of benzildimethyl ketal.

The thickness of the outer layer is 400–700 μm. The outer layer is cured by irradiation with 2 UV ring lamps (each 2000 W), the coated rods being passed through the ring lamps at a throughput speed of 4.5 m/min at a distance of 10 cm.

(b) The procedure is carried out according to (a) except that, before curing, quartz powder having a particle size of 0.1–0.3 mm is scattered onto the outer layer.

(c) The procedure is carried out according to (a) except that the layers consist of the following mixtures:

Inner layer (a) 100 parts by weight of epoxidised novolak, viscosity 1400–2000 mPas (50° C.), epoxide content 5.6–5.8 Val/kg,
(b) 12 parts by weight of dibutyl phthalate, and
(c) 44 parts by weight of ethylenediaminedibenzoate.

Outer layer (a) 452 parts by weight of acrylic acid ester from commercial bisphenol-A-diglycidyl ether, admixed with 30% by weight of tripropylene glycol diacrylate, viscosity (25° C.): 60–65 Pas,
(b) 97 parts by weight of 1,6-hexanediol diacrylate,
(c) 97 parts by weight of 1-vinyl-2-pyrrolidone, (d) 322 parts by weight of talcum,
(e) 6 parts by weight of silicic acid (Aerosil 200, Degussa), and
(f) 26 parts by weight of benzildimethyl ketal.

(d) The procedure is carried out according to (c) except that, before curing, quartz powder having a particle size of 0.1–0.3 mm is scattered onto the outer layer.

The coated rods according to (a) to (d) are enveloped in concrete and the concrete is allowed to set. By means of resistance heating, the rods are heated to 120° to 130° C., and after attainment of this temperature, the supply of current is discontinued. The inner layer is cured as a result of the heat capacity of the rods. Tensile tests are afterwards carried out on these test specimens. A fracture is observed solely in the concrete. The bonding strength of the inner layer on the steel, of the outer layer on the inner layer and between the outer layer and the concrete is therefore higher than the breaking strength of the concrete.

What is claimed is:

1. A prestressing element, which is metal, plastic, glass, carbon fibers or whiskers, onto which is applied an inner polymer-forming layer and an outer solid plastic layer, the said prestressing element being designed so that the inner layer consists of a moldable and thermally curable composition which is storage-stable at room temperature, and the outer layer consists of a plastic material cured by radiation.

2. A prestressing element according to claim 1, wherein the composition of the inner layer contains starting materials curable into the form of duroplasts by means of polyaddition or polymerisation.

3. A prestressing element according to claim 2, wherein the starting materials are epoxy resins, masked polyurethanes or unsaturated polyesters.

4. A prestressing element according to claim 2, wherein the inner layer is a solid pre-reacted epoxy resin.

5. A prestressing element according to claim 1, wherein the curable composition of the inner layer contains a curing agent which can be activated by heat.

6. A prestressing element according to claim 5 wherein the curable composition of the inner layer contains a curing agent which can be activated by heat and a curing accelerator.

7. A prestressing element according to claim 1, wherein the curable composition contains an epoxy resin based on glycidyl ethers of polyphenols.

8. A prestressing element according to claim 1, wherein the outer layer is in addition thermally curable.

9. A prestressing element according to claim 8, wherein the outer layer is thermally curable by virtue of the presence of epoxy groups.

10. A prestressing element according to claim 1, wherein the outer layer contains functional groups which react concomitantly with the thermal curing of the inner layer.

11. A prestressing element according to claim 1, wherein the outer layer is a radiation-cured epoxyacrylate or epoxymethacrylate, epoxy resin, polyesteracrylate or -methacrylate based on bisphenol, an unsaturated polyurethane or polyester, or a polymer having maleimide side groups.

12. A prestressing element according to claim 11, wherein the outer layer is a radiation-cured epoxy-acrylate or epoxymethacrylate, each of which is additionally admixed with at least one acrylic ester or methacrylic ester of an aliphatic polyol.

13. A prestressing element according to claim 1 wherein the inner and outer layers are separated by an intermediate layer of glass fibers or metal filaments.

14. A process for producing a two-layer plastic coating for a prestressing element, which is metal, plastic, glass, carbon fibers or whiskers, which comprises
(a) applying to the prestressing element an inner layer consisting of a moldable and thermally curable composition which is stable in storage at room temperature;
(b) applying an outer layer of a composition curable by radiation; and
(c) curing afterwards the outer layer by radiation.

15. A process according to claim 14 wherein after step (a) the inner layer is coated first with a separating intermediate layer of glass fibers or metal filaments before the outer layer is applied in step (b).

* * * * *